US011385462B2

(12) United States Patent
Nambara et al.

(10) Patent No.: US 11,385,462 B2
(45) Date of Patent: Jul. 12, 2022

(54) HEAD-UP DISPLAY DEVICE AND IMAGE PROJECTION UNIT

(71) Applicants: DENSO CORPORATION, Kariya (JP); TSUJIDEN Co., Ltd., Tokyo (JP)

(72) Inventors: Takahiro Nambara, Kariya (JP); Ryu Saeki, Suginami-ku (JP)

(73) Assignees: DENSO CORPORATION, Kariya (JP); TSUJIDEN Co., Ltd., Tokyo (JP)

( * ) Notice: Subject to any disclaimer, the term of this patent is extended or adjusted under 35 U.S.C. 154(b) by 241 days.

(21) Appl. No.: 16/787,908

(22) Filed: Feb. 11, 2020

(65) Prior Publication Data

US 2020/0174253 A1    Jun. 4, 2020

Related U.S. Application Data

(63) Continuation of application No. PCT/JP2018/026356, filed on Jul. 12, 2018.

(30) Foreign Application Priority Data

Sep. 7, 2017  (JP) .............................. JP2017-172396

(51) Int. Cl.
*G02B 27/01* (2006.01)
*G02B 5/02* (2006.01)
(Continued)

(52) U.S. Cl.
CPC .......... *G02B 27/0101* (2013.01); *B60K 35/00* (2013.01); *G02B 5/0257* (2013.01);
(Continued)

(58) Field of Classification Search
CPC ......................... G02B 27/0101; G02B 5/0231; G02B 5/0257; G02B 2027/0123;
(Continued)

(56) References Cited

U.S. PATENT DOCUMENTS 5,867,287 A     2/1999   Williams et al.
2004/0257651 A1  12/2004  Hirata et al.
(Continued)

FOREIGN PATENT DOCUMENTS

CN      1573527 A      2/2005
CN      1591088 A      3/2005
(Continued)

*Primary Examiner* — Ryan D Howard
(74) *Attorney, Agent, or Firm* — Harness, Dickey & Pierce, P.L.C.

(57) ABSTRACT

A head-up display device includes: an illumination light source unit configured to emit illumination light; an image forming unit configured to form the image by partial transmission of the illumination light and to emit the image as the display light; and an anisotropic diffusion unit disposed on an optical path between the illumination light source unit and the image forming unit to diffuse the illumination light at an anisotropic diffusion angle. When the image is displayed as a virtual image, the image is defined to have an image up-down axis in a direction along an up-down direction of the vehicle and an image left-right axis perpendicular to the image up-down axis. The diffusion angle in the anisotropic diffusion unit is larger in a direction corresponding to the image left-right axis than in a direction corresponding to the image up-down axis.

9 Claims, 7 Drawing Sheets

(51) Int. Cl.
  *B60K 35/00* (2006.01)
  *G02B 5/04* (2006.01)
  *G02F 1/1335* (2006.01)

(52) U.S. Cl.
  CPC ...... *G02B 5/045* (2013.01); *B60K 2370/1529* (2019.05); *B60K 2370/167* (2019.05); *B60K 2370/25* (2019.05); *B60K 2370/31* (2019.05); *G02B 2027/0118* (2013.01); *G02F 1/133528* (2013.01)

(58) Field of Classification Search
  CPC ........................ G02B 2027/0125; G02B 5/045; B60K 35/00; B60K 2370/1529
  See application file for complete search history.

(56) References Cited

U.S. PATENT DOCUMENTS

| | | |
|---|---|---|
| 2005/0111100 A1 | 5/2005 | Mather et al. |
| 2006/0087733 A1 | 4/2006 | Hirata et al. |
| 2007/0064174 A1 | 3/2007 | Kitamura et al. |
| 2016/0334637 A1 | 11/2016 | Saisho et al. |
| 2018/0210201 A1 | 7/2018 | Togasaki et al. |
| 2018/0307056 A1 | 10/2018 | Saisho et al. |

FOREIGN PATENT DOCUMENTS

| | | |
|---|---|---|
| JP | H08-190074 A | 7/1996 |
| JP | 4671117 B2 | 4/2011 |
| JP | 5353203 B2 | 11/2013 |
| JP | 2015148664 A | 8/2015 |
| JP | 2016071300 A | 5/2016 |
| JP | 2016139108 A | 8/2016 |
| JP | 2017009864 A | 1/2017 |
| WO | WO-2017/086002 A1 | 5/2017 |

HEAD-UP DISPLAY DEVICE AND IMAGE PROJECTION UNIT

CROSS REFERENCE TO RELATED APPLICATION

The present application is a continuation application of International Patent Application No. PCT/JP2018/026356 filed on Jul. 12, 2018, which designated the U.S. and claims the benefit of priority from Japanese Patent Application No. 2017-172396 filed on Sep. 7, 2017. The entire disclosures of all of the above applications are incorporated herein by reference.

TECHNICAL FIELD

The present disclosure relates to a head-up display device (hereinafter referred to as a HUD device) and an image projection unit.

BACKGROUND

A HUD device is mounted on a vehicle and projects and reflects display light of an image on a projection member to display an image as a virtual image that can be viewed by an occupant. An image projection unit includes an illumination light source unit, an image forming unit, and a diffusion unit. The illumination light source unit emits illumination light. The image forming unit forms an image by partial transmission of illumination light and emits the image as display light.

SUMMARY

In one aspect of the present disclosure, a head-up display device to be mounted on a vehicle to display a virtual image for an occupant by projecting a display light of an image onto a projection member to reflect, the head-up display device includes:

an illumination light source unit that emits illumination light;

an image forming unit that forms the image by partial transmission of the illumination light and emits the image as the display light; and an anisotropic diffusion unit disposed on an optical path between the illumination light source unit and the image forming unit to diffuse the illumination light at an anisotropic diffusion angle.

When the image is displayed as a virtual image, the image is defined to have an image up-down axis in a direction along an up-down direction of the vehicle and an image left-right axis perpendicular to the image up-down axis.

The diffusion angle in the anisotropic diffusion unit is larger in a direction corresponding to the image left-right axis than in a direction corresponding to the image up-down axis.

DETAILED DESCRIPTION

Figure 1:
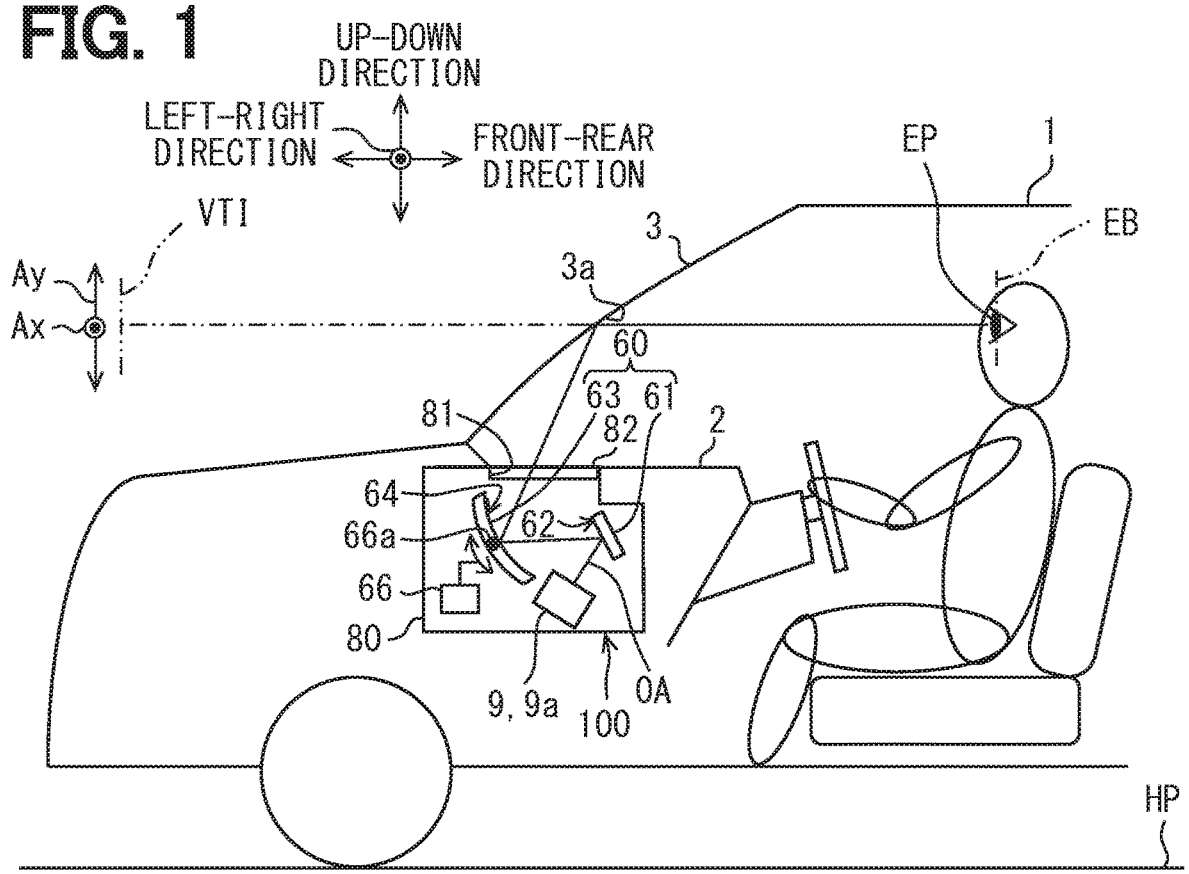
FIG. 1 is a schematic view illustrating a HUD device according to a first embodiment, which is mounted on a vehicle.

To begin with, examples of relevant techniques will be described.

Conventionally, a HUD device and an image projection unit used for the HUD device are known. The HUD device is mounted on a vehicle and projects and reflects display light of an image on a projection member to display an image as a virtual image that can be viewed by an occupant. The image projection unit includes an illumination light source unit, an image forming unit, and a diffusion unit. The illumination light source unit emits illumination light. The image forming unit forms an image by partial transmission of illumination light and emits the image as display light.

The diffusion unit is disposed on the optical path between the light source unit and the image forming unit. More specifically, the diffusion unit is composed of a Fresnel lens array in which Fresnel lens cells are formed as a collection of refractive surfaces of individual prisms arranged concentrically.

The diffusion unit exhibits a diffusion function by a set of refractive surfaces of individual prisms arranged concentrically, and has a property of diffusing illumination light at an isotropic diffusion angle, so-called isotropic property.

Such a diffusion unit is provided, for example, to expand an area in which the occupant can visually recognize a virtual image (hereinafter referred to as a visual recognition area). It is preferable that the visual recognition area be set large in a direction perpendicular to the up-down direction of the vehicle since eyes of the occupant are aligned in the direction (for example, the lateral direction of the vehicle).

However, when the diffusion unit has isotropy, illumination light is diffused at the same diffusion angle both in a direction corresponding to the up-down direction of the image and in a direction corresponding to the left-right direction of the image. As a result, the size of the visual recognition area cannot be secured sufficiently in the direction corresponding to the left-right direction of the image, or conversely, the illumination light is diffused more than necessary in the direction corresponding to the up-down direction of the image. In this case, there is a concern that the luminance is unnecessarily reduced, and there is room for improvement in the visibility of the virtual image.

The present disclosure provides a HUD device and an image projection unit with high visibility of a virtual image.

In one aspect of the present disclosure, a head-up display device to be mounted on a vehicle to display a virtual image for an occupant by projecting a display light of an image onto a projection member to reflect, the head-up display device includes:

an illumination light source unit that emits illumination light;

an image forming unit that forms the image by partial transmission of the illumination light and emits the image as the display light; and an anisotropic diffusion unit disposed on an optical path between the illumination light source unit and the image forming unit to diffuse the illumination light at an anisotropic diffusion angle.

When the image is displayed as a virtual image, the image is defined to have an image up-down axis in a direction along an up-down direction of the vehicle and an image left-right axis perpendicular to the image up-down axis.

The diffusion angle in the anisotropic diffusion unit is larger in a direction corresponding to the image left-right axis than in a direction corresponding to the image up-down axis.

According to the HUD device, the diffusion unit disposed on the optical path between the illumination light source unit and the image forming unit has an anisotropy that diffuses the illumination light at an anisotropic diffusion angle. In the anisotropic diffusion unit, the diffusion angle in the direction corresponding to the image left-right direction is larger than the diffusion angle in the direction corresponding to the image up-down direction. Therefore, the display light transmitted through the image forming unit and emitted and reflected by the projection member spreads more in a direction perpendicular to the up-down direction of the vehicle than in the up-down direction of the vehicle and reaches the visual recognition area. That is, the visual recognition area is expanded in the direction perpendicular to the up-down direction of the vehicle in which eyes of the occupant are aligned. Therefore, the visibility of the virtual image with the eyes of the occupant is improved. At the same time, the diffusion is more suppressed in the up-down direction of the vehicle than in the direction perpendicular to the up-down direction of the vehicle where the eyes of the occupants are aligned. Therefore, the brightness of the visually recognized virtual image can be improved. Accordingly, it is possible to provide a HUD device with high visibility of a virtual image.

In another aspect of the present disclosure, an image projection unit for a head-up display device to be mounted on a vehicle to display a virtual image for an occupant by projecting a display light of an image onto a projection member to reflect, the image projection unit projecting the display light and including:

an illumination light source unit that emits illumination light;

an image forming unit that forms the image by partial transmission of the illumination light and emits the image as the display light; and an anisotropic diffusion unit disposed on an optical path between the illumination light source unit and the image forming unit to diffuse the illumination light at an anisotropic diffusion angle.

When the image is displayed as a virtual image, the image is defined to have an image up-down axis in a direction along an up-down direction of the vehicle and an image left-right axis perpendicular to the image up-down axis.

The diffusion angle in the anisotropic diffusion unit is larger in a direction corresponding to the image left-right axis than in a direction corresponding to the image up-down axis.

According to the image projection unit, the diffusion unit disposed on the optical path between the illumination light source unit and the image forming unit has an anisotropy that diffuses the illumination light at an anisotropic diffusion angle. In the anisotropic diffusion unit, the diffusion angle in the direction corresponding to the image left-right direction is larger than the diffusion angle in the direction corresponding to the image up-down direction. Therefore, the display light transmitted through the image forming unit and emitted and reflected by the projection member spreads more in the direction perpendicular to the up-down direction of the vehicle than in the up-down direction of the vehicle and reaches the visual recognition area. That is, the visual recognition area is expanded in the direction perpendicular to the up-down direction of the vehicle in which the eyes of the occupant are aligned. Therefore, the visibility of the virtual image with the eyes of the occupant is improved. At the same time, the diffusion is more suppressed in the up-down direction of the vehicle than in the direction perpendicular to the up-down direction of the vehicle where the eyes of the occupants are aligned. Therefore, the brightness of the visually recognized virtual image can be improved. Accordingly, it is possible to provide an image projection unit that realizes a HUD device with high visibility of a virtual image.

Hereinafter, embodiments will be described with reference to the drawings. It should be noted that the same reference numerals are assigned to the corresponding components in the respective embodiments, so that overlapping descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the embodiments can be partially combined even if they are not explicitly shown if there is no problem in the combinations.

First Embodiment

As shown in FIG. 1, a head-up display device 100 according to the first embodiment of the present disclosure is mounted on a vehicle 1 and housed in an instrument panel 2. The term "vehicle" is broadly understood to include vehicles such as aircraft and ships as well as automobiles and railway vehicles. The HUD device 100 projects display light of an image onto a windshield 3 as a projection member of the vehicle 1. The HUD device 100 thus displays an image as a virtual image VTI visible by an occupant. That is, the display light reflected by the windshield 3 reaches a visual recognition area EB in the cabin of the vehicle 1, and the occupant whose eye point EP for eyes is located in the visual recognition area EB perceives the light. Thus, the occupant can recognize various information displayed as virtual images VTI. The various information displayed as the virtual image VTI includes information related to the operation of the vehicle 1 such as vehicle speed, fuel remaining amount, road information, and visibility auxiliary information.

In the following, the up-down direction of the vehicle 1 (including upper side and lower side), the front-rear direction of the vehicle 1 (including forward and backward), and the left-right direction of the vehicle 1 are defined based on the vehicle 1 on the horizontal plane HP.

The windshield 3 of the vehicle 1 is formed of a light transmissive glass or a synthetic resin in a plate shape. The windshield 3 has a projection surface 3a on which a display light is projected. The projection surface 3a is formed in a smooth concave or planar shape. The projection surface 3a faces the lower side of the vehicle 1 and the rear side of the vehicle 1. As the projection member, instead of the windshield 3, a combiner that is separate from the vehicle 1 may be installed inside the vehicle 1, and the image may be projected onto the combiner.

The visual recognition area EB is a space area also referred to as an eye box, where the virtual image VTI displayed by the HUD device 100 can be visually recognized at a sufficient luminance level. Typically, the visual recognition area EB is provided to overlap an eyelips set in the vehicle 1. The eyelips is set based on an eye range that represents statistic distributions of occupant eye points. For details of the eyelips, reference can be made to JIS D 0021: 1998. Generally, the eyelips is set by a vehicle manufacturer according to the position of the seat of the vehicle 1.

That is, the visual recognition area EB of the present embodiment is designed so that the occupant on the seat can easily visually recognize. More specifically, the visual recognition area EB is designed to have the width in the left-right direction of the vehicle 1 larger than the width in the up-down direction of the vehicle 1 in consideration that eyes of the occupant are aligned in the left-right direction of the vehicle 1.

A specific configuration of the HUD device 100 will be described below with reference to FIGS. 2-10. The HUD device 100 includes an illumination light source unit 10, a light collecting unit 30, an anisotropic diffusion unit 20, an image display panel 50, and a light guide unit 60, which are housed and held by a housing 80.

Figure 2:
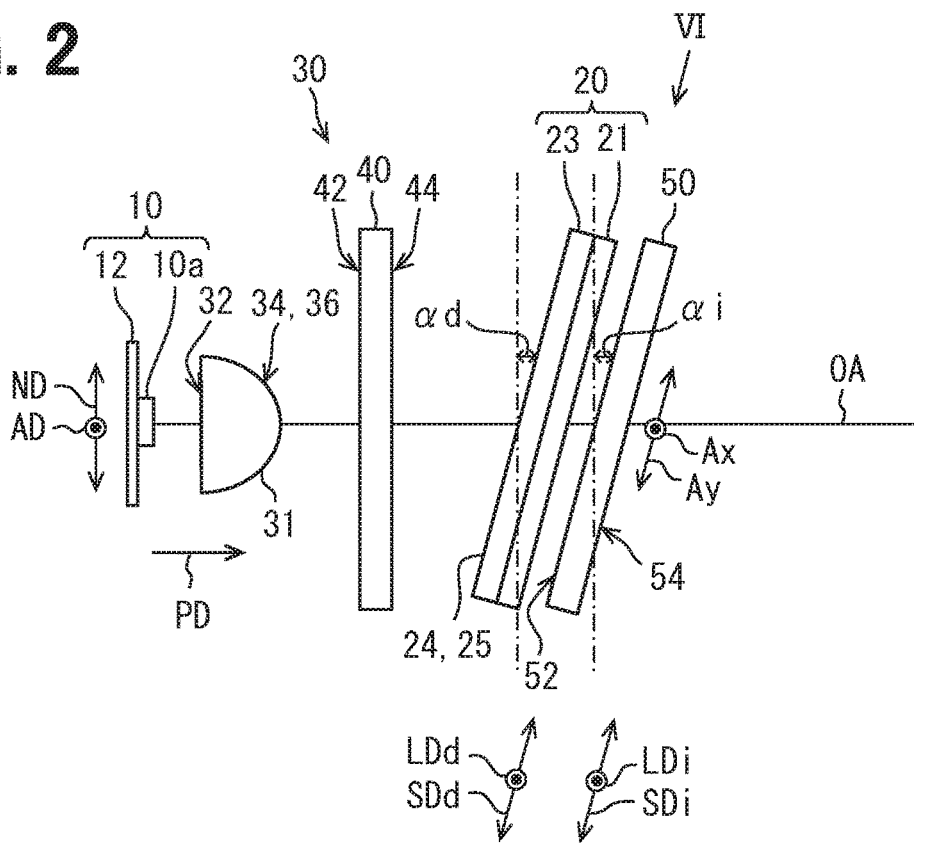
FIG. 2 is a side view schematically illustrating an image projection unit according to the first embodiment.

As shown in FIG. 2, the illumination light source unit 10, the light collecting unit 30, the anisotropic diffusion unit 20, and the image display panel 50 define an image projection unit 9, and are housed in a casing 9a having a light shielding property. The image projection unit 9 projects display light of an image toward the light guide unit 60 through the display surface 54 of the image display panel 50.

As shown in FIG. 1, the light guide unit 60 guides the display light incident from the image projection unit 9 to the windshield 3. The light guide unit 60 has a plane mirror 61 and a concave mirror 63.

The plane mirror 61 is a reflecting mirror formed by depositing aluminum as a reflection surface 62 on the surface of a base material made of a synthetic resin or glass. The reflection surface 62 is formed in a smooth planar shape. The display light incident on the plane mirror 61 from the image projection unit 9 is reflected by the reflection surface 62 toward the concave mirror 63.

The concave mirror 63 is a reflecting mirror formed by depositing aluminum as a reflection surface 64 on the surface of a base material made of synthetic resin or glass. The reflection surface 64 is formed in a smooth concave surface shape curved in a concave shape. The display light incident on the concave mirror 63 is reflected by the reflection surface 64 toward the windshield 3.

The housing 80 has a window 81 between the concave mirror 63 and the windshield 3. A translucent dustproof cover 82 closes the window 81. Therefore, the display light from the concave mirror 63 passes through the dustproof cover 82 and enters the windshield 3. The display light reflected by the windshield 3 reaches the visual recognition area EB, and the occupant can view the virtual image VTI. The virtual image VTI is visually recognized by the occupant in more expanded state than an image on the display surface 54 due to the magnifying action of the concave mirror of the light guide unit 60. When the projection surface 3a of the windshield 3 is curved, the virtual image VTI is further subjected to the magnifying action by the windshield 3.

In the present embodiment, when the image is displayed as a virtual image, the image is defined to have an image up-down axis Ay in a direction along the up-down direction of the vehicle 1 and an image left-right axis Ax in a direction perpendicular to the image up-down axis Ay. In the present embodiment, the display surface 54 of the image display panel 50 is formed in a rectangular shape. A short direction SDi of the display surface 54 corresponds to the image up-down axis Ay, and a longitudinal direction LDi of the display surface 54 corresponds to the image left-right axis Ax. That is, the dimension in the direction corresponding to the image left-right axis Ax is longer than the dimension in the direction corresponding to the image up-down axis Ay in both the image on the display surface 54 and the image displayed as the virtual image VTI.

The HUD device 100 includes a drive mechanism 66 that drives the concave mirror 63 to swing. The drive mechanism 66 drives a stepping motor, for example, in response to an operation of the operation switch by the occupant, and drives the concave mirror 63 to swing around the rotation shaft 66a. The rotation shaft 66a is arranged to extend along the direction corresponding to the image left-right axis Ax. The imaging positions of the virtual images VTI move up and down at the same time by swinging the concave mirror 63, to adjust the position easy for the occupant to see. At this time, the visual recognition area EB is also moved in the up-down direction of the vehicle 1.

Details of the image projection unit 9 in the HUD device 100 will be described below.

As shown in FIG. 2, the illumination light source unit 10 is formed by mounting plural light emitting elements 10a on a light source circuit board 12 formed in a flat plate shape. The plural light emitting elements 10a are arranged at predetermined intervals, for example, in the arrangement direction AD. In the present embodiment, the arrangement direction AD is one direction, but the light emitting elements 10a may be arranged in two directions. In the present embodiment, the arrangement direction AD is a direction corresponding to the image left-right axis Ax.

Each of the light emitting elements 10a is, for example, a light emitting diode element that generates less heat. The light emitting element 10a is electrically connected to a power supply through a wiring pattern on the light source circuit board 12. More specifically, the light emitting element 10a is formed by sealing a chip-like blue light emitting diode element with a yellow fluorescent material in which a yellow fluorescent agent is mixed with a translucent synthetic resin. The yellow phosphor is excited to emit yellow light by blue light emitted from the blue light emitting diode element according to the amount of current, and Illumination light is emitted as pseudo white and randomly polarized light from the light emitting element 10a by mixing blue light and yellow light.

Figure 3:
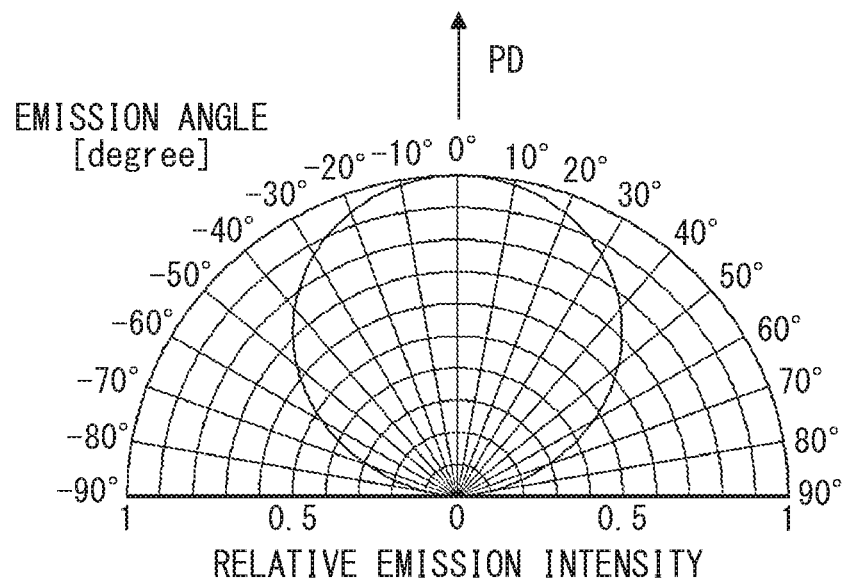
FIG. 3 is a graph illustrating a radiation angle distribution of a light emitting element of the first embodiment.

As shown in FIG. 3, each of the light emitting elements 10a emits illumination light with a radiation angle distribution in which the light emission intensity relatively decreases as deviating from the peak direction PD where the light emission intensity is the maximum.

As shown in FIG. 2, the light collecting unit 30 is disposed on the optical path between the illumination light source unit 10 and the anisotropic diffusion unit 20, and includes a light collecting lens array 31 and a complex lens array 40. The light collecting unit 30 condenses and parallelizes the illumination light from the light emitting elements 10a using the lens arrays 31 and 40, and emits the light toward the anisotropic diffusion unit 20 and the image display panel 50 on the optical path. The "parallelizing" in the present embodiment means that the illumination light emitted radially from the light emitting element 10a becomes a state closer to the parallel luminous flux than the emitted state, and there is no need that the illumination light becomes a completely parallel luminous flux.

The light collecting lens array 31 is disposed on the optical path between the illumination light source unit 10 and the anisotropic diffusion unit 20. The light collecting lens array 31 of the light collecting unit 30 is an optical device located between the illumination light source unit 10 and the complex lens array 40 on the optical path. The light collecting lens array 31 is a lens array formed of a translucent synthetic resin or glass.

An incident side surface 32 of the light collecting lens array 31 opposes the light emitting elements 10a, and has a smooth flat shape common to a whole of the light collecting lens arrays 31. An emission side surface 34 of the light collecting lens array 31 opposes the complex lens array 40, and plural light collecting convex surfaces 36 are formed in an array on the emission side surface 34.

Each of the light collecting convex surfaces 36 is provided to form a pair with the corresponding light emitting element 10a. Specifically, the light collecting convex surfaces 36 are provided in the same number as the light emitting elements 10a, and are arranged similarly as the light emitting elements 10a along the same arrangement direction AD.

Each of the light collecting convex surfaces 36 is formed in a smooth curved surface shape which is curved to be a convex protruding toward the complex lens array 40. In the present embodiment, the light collecting convex surfaces 36 are formed in the same spherical shape. The shape of each light collecting convex surface 36 can be suitably changed, for example, according to the shape of the complex lens array 40.

The illumination light from each of the light emitting elements 10a is mainly incident on the paired light collecting convex surface 36 and is refracted, to receive an individual light collecting action of the corresponding convex surface 36. Further, the illumination light emitted from the light collecting lens array 31 enters the complex lens array 40.

The complex lens array 40 is disposed on the optical path between the illumination light source unit 10 and the anisotropic diffusion unit 20, and is an optical device located between the anisotropic diffusion unit 20 and the light collecting lens array 31 of the light collecting unit 30. The complex lens array 40 is formed of a translucent synthetic resin or glass, and has a generally flat plate shape disposed perpendicularly to the optical axis OA as a whole. In the present embodiment, the optical axis OA is defined as a path of a reference light beam passing through the center of the display surface 54 of the image display panel 50 in the peak direction PD.

Figure 4:
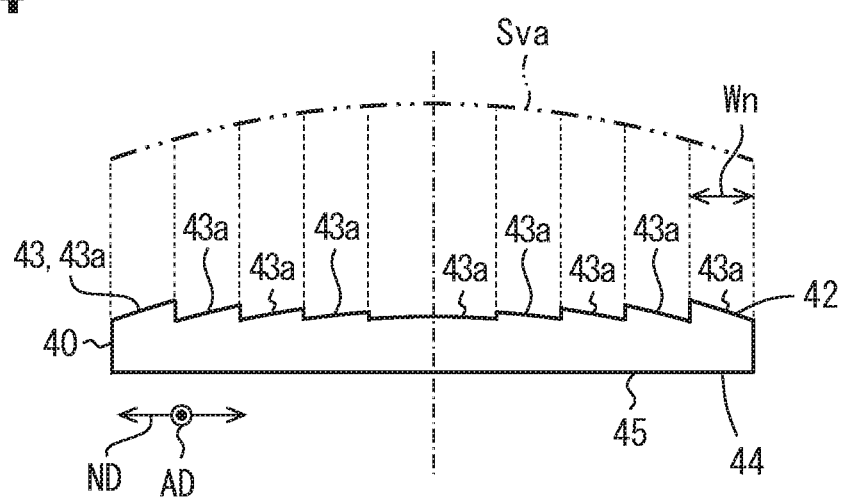
FIG. 4 is a view illustrating a detailed shape of an incident surface of a complex lens array according to the first embodiment.
Figure 5:
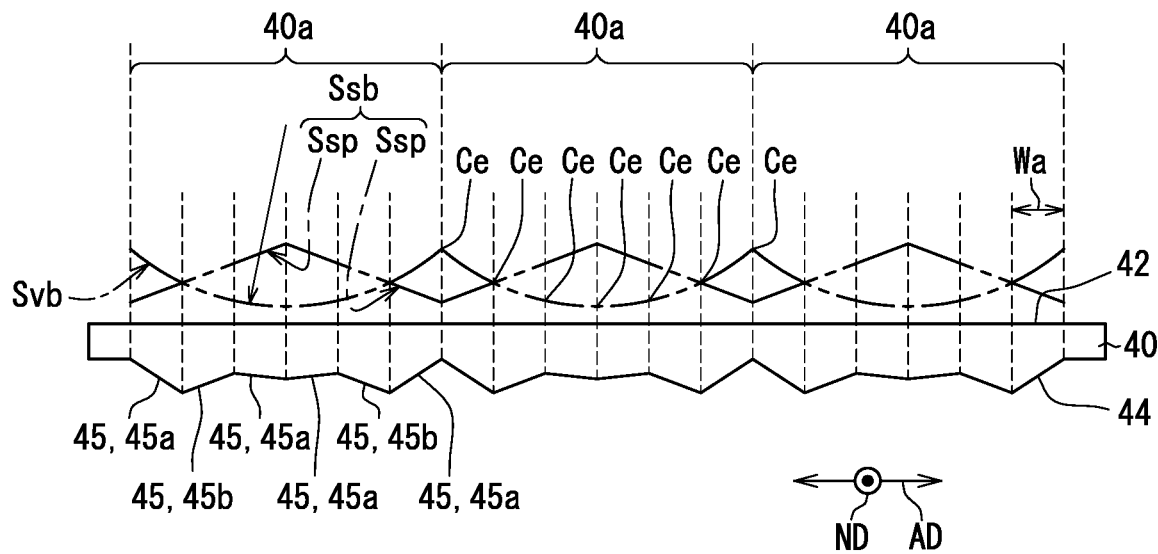
FIG. 5 is a view illustrating a detailed shape of an exit surface of the complex lens array according to the first embodiment.

As shown in FIGS. 4 and 5, specifically, the complex lens array 40 is an integrally-formed lens array in which plural cell blocks 40a are arranged. In the present embodiment, the cell blocks 40a are provided in the same number as the light emitting elements 10a and the light collecting convex surfaces 36. The cell blocks 40a are arranged in the same arrangement direction AD as the light emitting elements 10a and the light collecting convex surfaces 36. In the present embodiment, the cell blocks 40a have substantially the same shape.

As shown in FIG. 4, an incident side surface 42 of the complex lens array 40 faces the light collecting lens array 31, and plural divided lens surfaces 43 are formed on the incident side surface 42 in a state of being divided into stripes. The dividing direction of the divided lens surface 43 on the incident side surface 42 is, for example, along an arrangement orthogonal direction ND orthogonal to the arrangement direction AD. A boundary line of the divided lens surfaces 43 adjacent to each other is extended linearly along the arrangement direction AD. Therefore, in a cross section including the arrangement direction AD, one divided lens surface 43 is formed across the plural cell blocks 40a. In this way, each of the divided lens surfaces 43 is formed as one divided region divided by a predetermined division width Wn.

In the present embodiment, the divided lens surface 43 has divided convex surfaces 43a divided as in a convex Fresnel lens shape. The divided convex surface 43a is formed based on one virtual convex curved surface Sva defined as a virtual lens surface in the complex lens array 40. The virtual convex curved surface Sva has a smooth cylindrical surface shape by being curved in the arrangement orthogonal direction ND in a convex shape protruding toward the light collecting lens array 31. Therefore, the incident side surface 42 condenses the illumination light mainly in the arrangement orthogonal direction ND.

As shown in FIG. 5, the exit side surface 44 of the complex lens array 40 faces the anisotropic diffusion unit 20, and plural divided lens surfaces 45 are formed on the exit side surface 44 in a state of being divided into stripes. The dividing direction of the divided lens surfaces 45 on the exit side surface 44 is along the arrangement direction AD, and a boundary line of the divided lens surfaces 45 adjacent to each other is extended linearly along the arrangement orthogonal direction ND. Thus, each of the divided lens surfaces 45 is formed as one divided region divided by a predetermined division width Wa.

Focusing on one cell block 40a, plural approximate planes 45a and plural retro-refractive planes 45b are provided as the divided lens surfaces 45. The approximate plane 45a is formed based on a virtual convex curved surface Svb defined as a virtual lens surface in the complex lens array 40. The virtual convex curved surface Svb has a smooth cylindrical surface shape by being curved in the arrangement direction AD in a convex shape protruding toward the anisotropic diffusion unit 20.

The approximate plane 45a is formed in a plane as an approximate plane obtained by linear interpolation of plural coordinates extracted from the virtual convex curved surface Svb. In the present embodiment, the end coordinates Ce of the virtual convex curved surface at the end of each divided area are adopted as the plural coordinates. A gradient of the approximate plane 45a is obtained by linear interpolation between the end coordinates Ce. The virtually convex curved surface Svb appears partially on the exit side surface 44 in a state of being made planar by approximation.

The retro-refractive plane 45b is disposed between the approximate planes 45a. The retro-refractive plane 45b is formed based on a virtual inclined surface Ssb defined as a virtual lens surface in the complex lens array 40. The virtual inclined surface Ssb is configured by plural planar slopes Ssp replacing the reverse gradient at a location corresponding to the surface vertex of the virtual convex curved surface Svb in a cross section including the arrangement direction AD. The gradient of each planar slope Ssp is set to be a reverse gradient to the gradient of the corresponding portion of the virtual convex curved surface Svb. The retro-refractive plane 45b appears partially on the exit side surface 44 by extracting a part of the virtual inclined surface Ssb.

In the present embodiment, for example, six divided lens surfaces 45 are set for one cell block 40a. The six divided lens surfaces 45 are arranged in order of the approximate plane 45a, the retro-refractive plane 45b, the approximate plane 45a, the approximate plane 45a, the retro-refractive plane 45b, and the approximate plane 45a. A boundary between the approximate planes 45a adjacent to each other is a point corresponding to the surface vertex of the virtual convex curved surface Svb. In FIG. 5, each reference numeral is attached only to a part of the corresponding elements.

Thus, the exit side surface 44 collects the illumination light, mainly in the arrangement direction AD. More specifically, the illumination light refracted at the approximate plane 45a receives a refracting action in the same direction as the light condensing action of the normal convex surface, and the deflection amount is based on an approximated gradient of the virtual convex curved surface Svb. For this reason, the illumination light refracted at the approximate plane 45a is condensed in actual. The illumination light refracted at the retro-refractive plane 45b is refracted in the opposite direction to the adjacent approximate plane 45a as a refracting action. The illumination light reversely refracted by the retro-refractive plane 45b is mixed with the illumination light virtually condensed by the approximate plane 45a. As a result, an illumination unevenness caused by the arrangement of the light emitting elements 10a through gaps is substantially eliminated, and the collimated illumination light enters the anisotropic diffusion unit 20.

As shown in FIG. 2, the anisotropic diffusion unit 20 is disposed on the optical path between the illumination light source unit 10 and the image display panel 50, specifically on the optical path between the light collecting unit 30 and the image display panel 50. The anisotropic diffusion unit 20 is arranged to be inclined with respect to the optical axis OA, such that the anisotropic diffusion unit 20 forms an inclination angle αd of, for example, 10 to 15 degrees relative to the complex lens array 40. The anisotropic diffusion unit 20 diffuses the illumination light at an anisotropic diffusion angle. The anisotropic diffusion unit 20 has a rectangular shape and a substantially flat shape substantially equal to the shape and size of the image display panel 50. Similarly to the display surface 54 of the image display panel 50, the short direction SDd of the anisotropic diffusion unit 20 corresponds to the image up-down axis Ay, and the longitudinal direction LDd of the anisotropic diffusion unit 20 corresponds to the image left-right axis Ax.

Figure 6:
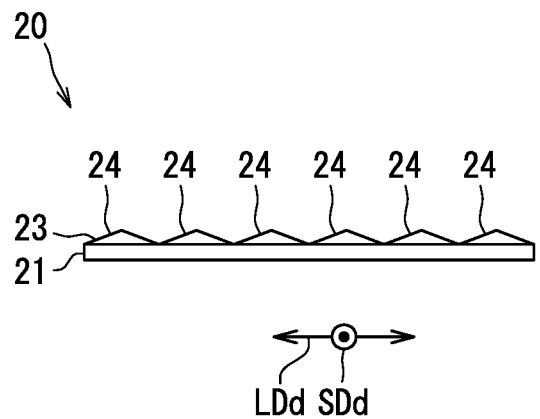
FIG. 6 is a view of an anisotropic diffusion unit of the first embodiment as viewed in a direction VI in FIG. 2.

As shown in FIGS. 2 and 6, the anisotropic diffusion unit 20 of the present embodiment has an isotropic diffusion layer 21 and an anisotropic prism array layer 23 stacked with each other. The isotropic diffusion layer 21 and the anisotropic prism array layer 23 are bonded to each other to reduce reflection of illumination light between the isotropic diffusion layer 21 and the anisotropic prism array layer 23.

The isotropic diffusion layer 21 is stacked on the anisotropic prism array layer 23 and has an isotropic diffusion angle. The isotropic diffusion layer 21 is formed in a sheet shape or a flat plate shape by mixing diffusion particles such as microbeads with a base material made of a translucent synthetic resin having high transmittance such as acrylic resin or polycarbonate resin.

The diffusion angle of the isotropic diffusion layer 21 of the present embodiment is substantially the same in the directions, and is set to be, for example, about 5 to 25 degrees. The diffusion angle in the present embodiment means an angle in a range where the light intensity is half or more with respect to a light intensity at the peak angle at which the light intensity shows the maximum value in the radiation angle distribution of light after the parallel light flux passes through the diffusion target.

Strictly speaking, the isotropic diffusion layer 21 exhibits high isotropy with respect to the diffusion of light vertically incident on the isotropic diffusion layer 21. However, due to the above-described inclined arrangement, the isotropy is slightly reduced when the illumination light obliquely enters from the complex lens array 40. Meanwhile, in the present embodiment, since the inclination angle αd of the isotropic diffusion layer 21 is in the range of 10 to 15 degrees sufficiently smaller than 45 degrees, it can be regarded as the diffusion angle of the isotropic diffusion layer 21 is substantially isotropic.

The anisotropic prism array layer 23 is stacked on the isotropic diffusion layer 21. As shown in FIG. 6, the anisotropic prism array layer 23 has plural prism elements 24, and each of the prism elements 24 extends along the short direction SDd corresponding to the image up-down axis Ay. The prism elements 24 are arranged in the longitudinal direction LDd corresponding to the image left-right axis Ax, whereby the anisotropic prism array layer 23 is formed in a sheet shape. The arrangement pitch of the prism elements 24 is preferably set in the range of several micrometers to several hundreds of micrometers. Although each prism element 24 is schematically illustrated in a large size in FIG. 6, a larger number of prism elements 24 are actually arranged.

Figure 7:
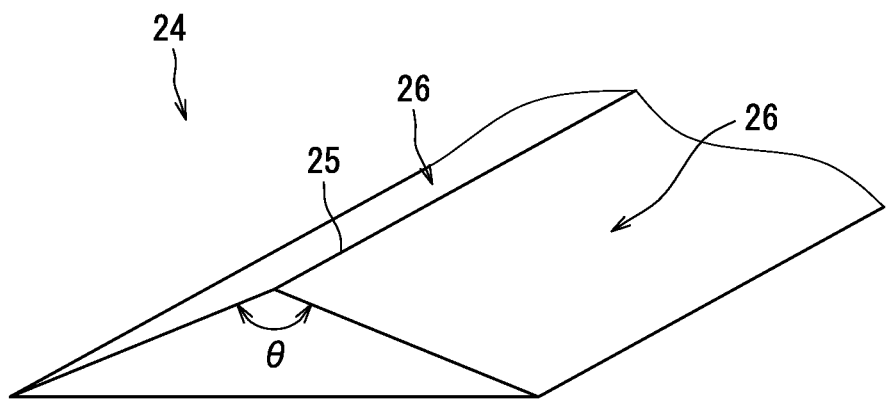
FIG. 7 is a perspective view partially illustrating a prism element of the first embodiment.

As shown in FIG. 7, each of the prism elements 24 of the present embodiment extends along the short direction SDd corresponding to the image up-down axis Ay, and has a triangular cross section in a plane including the longitudinal direction LDd corresponding to the image left-right axis Ax. Each of the prism elements 24 has a triangular prism shape having an apex 25 on the opposite side to the isotropic diffusion layer 21, and the apex 25 is defined between a pair of planar refractive surfaces 26 in the triangular cross section. The apex angle θ of the apex 25 is the same among the prism elements 24. The apex angle θ is an obtuse angle, and more preferably in the range of 120 to 160 degrees.

In the present embodiment, as shown in FIG. 2, the apex 25 of the anisotropic prism array layer 23 is disposed to face the illumination light source unit 10 and the light collecting unit 30 on the optical path. In other words, the anisotropic prism array layer 23 is disposed on the isotropic diffusion layer 21 to face the illumination light source unit 10 and the light collecting unit 30. The isotropic diffusion layer 21 is located between the image display panel 50 and the anisotropic prism array layer 23.

When illumination light from the complex lens array 40 is incident on the anisotropic diffusion unit 20, the illumination light is refracted at each refractive surface 26 of the anisotropic prism array layer 23. The illumination light is deflected in the longitudinal direction LDd due to the refraction because each refractive surface 26 is inclined to approach the isotropic diffusion layer 21 as the distance from the apex 25 increases along the longitudinal direction LDd. Since the inclination direction is opposite between the pair of refractive surfaces 26, the deflection direction is also reversed according to the refractive surfaces 26 on which the light is incident. Thus, the illumination light deflected in the longitudinal direction LDd enters the isotropic diffusion layer 21. Specifically, the illumination light is incident on the isotropic diffusion layer 21 in the state where illumination lights deflected in the opposite directions are mixed in the longitudinal direction LDd corresponding to the image left-right axis Ax after passing through the anisotropic prism array layer 23.

Therefore, while the isotropic diffusion layer 21 itself is defined to have the diffusion performance with an isotropic diffusion angle as described above, the actual diffusion angle of illumination light after being diffused by the isotropic diffusion layer 21 is different between the short direction SDd and the longitudinal direction LDd. Specifically, when viewing a whole of the anisotropic diffusion unit 20, the diffusion angle in the longitudinal direction LDd corresponding to the image left-right axis Ax is larger than the diffusion angle in the short direction SDd corresponding to the image up-down axis Ay. Thus, illumination light diffused at different diffusion angles between the directions LDd and SDd by the anisotropic diffusion unit 20 is incident on the image display panel 50.

The image display panel 50 of the present embodiment is a liquid crystal panel using thin film transistors (Thin Film Transistor, TFT), for example, an active matrix type and transmission type liquid crystal panel formed of plural liquid crystal pixels 50a arranged in two dimensions.

Figure 8:
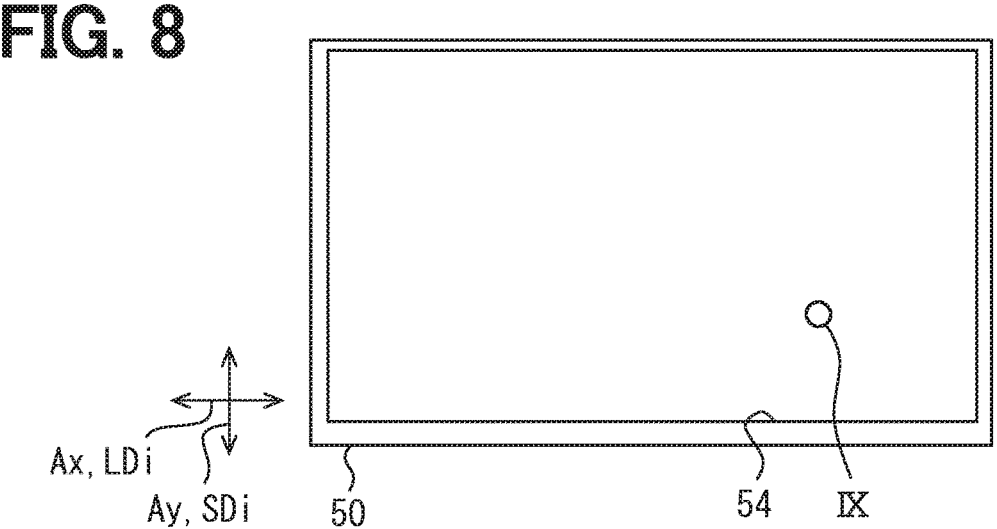
FIG. 8 is a front view illustrating a display surface of an image display panel of the first embodiment.
Figure 9:
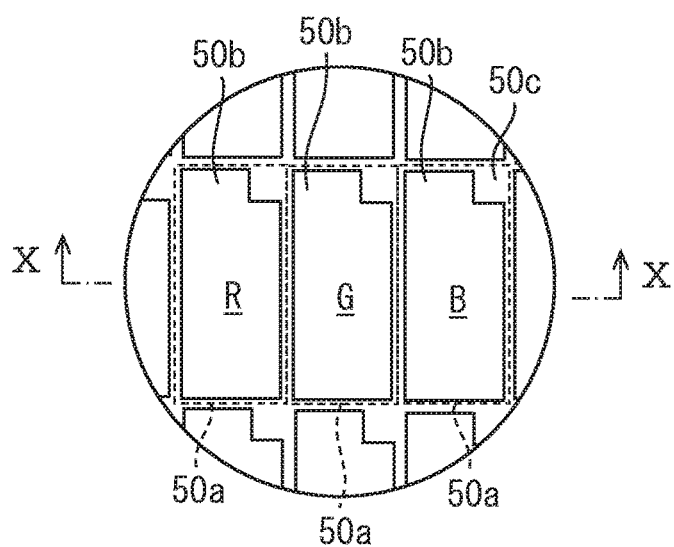
FIG. 9 is an enlarged view of a portion IX of FIG. 8.

Specifically, as shown in FIG. 8, the image display panel 50 has a rectangular panel shape in which the image left-right axis Ax corresponds to the longitudinal direction LDi. In the present embodiment, the longitudinal direction LDi is along the arrangement direction AD. The liquid crystal pixels 50a shown in FIG. 9 are two-dimensionally arranged in the longitudinal direction LDi and the short direction SDi. Therefore, the display surface 54 for emitting an image as display light toward the light guide unit 60 also has a rectangular shape as described above. Each of the liquid crystal pixel 50a has a transmissive portion 50b passing through in the normal direction of the display surface 54, and a wiring portion 50c formed to surround the transmissive portion 50b.

Figure 10:
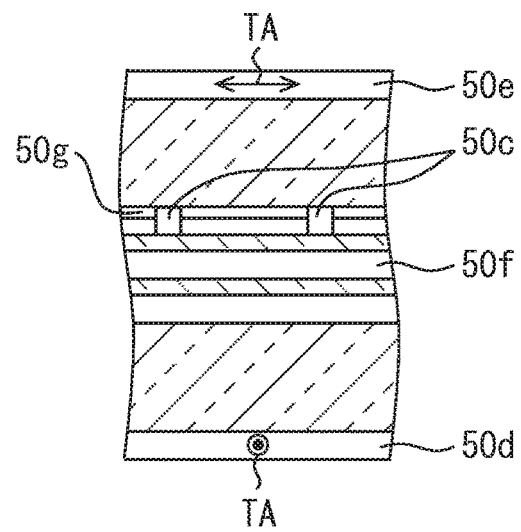
FIG. 10 is a cross-sectional view taken along a line X-X in FIG. 9.

As shown in FIG. 10, the image display panel 50 has a flat plate shape in which polarizing plates 50d and 50e are stacked on a liquid crystal layer 50f interposed between the polarizing plates 50d, 5e. Each of the polarizing plates 50d and 50e has a property of transmitting light polarized in a direction along the transmission axis TA and absorbing light polarized in a direction perpendicular to the transmission axis TA. The polarizing plates 50d and 50e are disposed such that the transmission axis TA of the polarizing plate 50d and the transmission axis TA of the polarizing plate 50e are orthogonal to each other. The liquid crystal layer 50f can rotate the polarization direction of the light incident on the liquid crystal layer 50f in accordance with a voltage applied to each liquid crystal pixel 50a. It is possible to change the ratio of light transmitted through the polarizing plate 50e on the emission side by rotating the polarization direction. That is, the transmittance can be changed.

Therefore, the image display panel 50 controls the transmittance of each liquid crystal pixel 50a with respect to the incidence of the illumination light on the illumination target surface 52 which is a surface facing the anisotropic diffusion unit 20. That is, the image display panel 50 functions as an image forming unit that forms an image by partial transmission of illumination light and emits the image as display light. The liquid crystal pixels 50a adjacent to each other are provided with color filters 50g of different colors (for example, red, green and blue). Various colors are realized by combining the color filters 50g, as display colors.

As shown in FIG. 2, the illumination target surface 52 of the image display panel 50 opposes the isotropic diffusion layer 21 of the anisotropic diffusion unit 20 with a slight clearance, and the image display panel 50 is disposed in parallel with the anisotropic diffusion unit 20. That is, the image display panel 50 is also disposed to be inclined with respect to the optical axis OA so as to form an inclination angle $\alpha i$ of, for example, 10 to 15 degrees with respect to the complex lens array. The distance between the anisotropic diffusion unit 20 and the image display panel 50 is set smaller than the distance between the anisotropic diffusion unit 20 and the complex lens array 40.

The illumination light incident on the illumination target surface 52 of the image display panel 50 from the anisotropic diffusion unit 20 passes through the transmissive portion 50b of each liquid crystal pixel 50a as described above, and is emitted as display light from the transmissive portion 50b. At the time of emission, the display light is oriented based on the anisotropic diffusion angle at the anisotropic diffusion unit from each liquid crystal pixel 50a.

In the anisotropic diffusion unit 20, the diffusion angle in the longitudinal direction LDd is set larger than the diffusion angle in the short direction SDd. Therefore, the display light emitted from each liquid crystal pixel 50a is made to be oriented with an orientation angle in the longitudinal direction LDi corresponding to the image left-right axis Ax, which is larger than that in the short direction SDi corresponding to the image up-down axis Ay.

In this way, the shape and the size of the visual recognition area EB is determined by the reach range of the display light after the display light passes through the light guide unit 60 and the windshield 3. That is, according to the orientation of the display light described above, the size of the visual recognition area EB is larger in the lateral direction of the vehicle 1 corresponding to the image left-right axis Ax than in the up-down direction of the vehicle 1 corresponding to the image up-down axis Ay. As a result, the visual recognition area EB can sufficiently cover the eye points EP of the eyes of the occupant aligned in the lateral direction of the vehicle 1, and the virtual image VTI can be recognized with high visibility with the eyes.

The image display panel 50 and the anisotropic diffusion unit 20 are disposed in parallel with each other, and are inclined to the optical axis OA in the optical path of the HUD device 100 and the image projection unit 9. The inclination direction and angle of the image display panel 50 with respect to the optical axis OA is set in consideration of the arrangement angle of the light guide unit 60 and the windshield 3 to satisfy a condition of a shine proof. In the present embodiment, each of the image display panel 50 and the anisotropic diffusion unit 20 is arranged to be inclined in a state of being rotated about a virtual rotation axis along the image left-right axis Ax (that is, along the longitudinal direction LDi or LDd) from a posture perpendicular to the optical axis OA, so as to set the orientation.

According to the inclination direction and angle set in this way, the virtual image VTI visually recognized from the visual recognition area EB is restricted from being inclined.

Further, outside light such as sunlight which enters the HUD device 100 through the windshield 3 is restricted from reaching the visual recognition area EB by being reflected by the display surface 54.

According to the combination of the image display panel 50 and the anisotropic diffusion unit 20 disposed in a slanted manner, the anisotropic prism array layer 23 of the anisotropic diffusion unit 20 has the prism elements 24 extended in the short direction SDd corresponding to the image up-down axis Ay. Therefore, optical effects such as refraction are hardly exerted in the longitudinal direction LDd corresponding to the image up-down axis Ay. That is, the anisotropic diffusion unit 20 of the present embodiment is less dependent on the inclination angle around the rotation axis along the image left-right axis Ax, and has high versatility with respect to a change of the inclination angle αd. That is, even if the inclination angle αi of the image display panel 50 and the inclination angles αd of the anisotropic diffusion unit 20 are changed in accordance with a design change in the arrangement of the light guide unit 60 and the windshield 3, there is less need to change the internal design of the anisotropic diffusion unit 20.

(Effects)

The operation and effect of the first embodiment will be explained below.

According to the first embodiment, the diffusion unit 20 disposed on the optical path between the illumination light source unit 10 and the image display panel 50 as the image forming unit has anisotropic property and diffuses the illumination light at an anisotropic diffusion angle. In the anisotropic diffusion unit 20, the diffusion angle in the longitudinal direction LDd corresponding to the image left-right axis Ax is larger than the diffusion angle in the short direction SDd corresponding to the image up-down axis Ay. Therefore, the display light transmitted and emitted from the image display panel 50 and reflected by the windshield 3 as the projection member spreads in a direction perpendicular to the up-down direction of the vehicle 1 more than in the up-down direction of the vehicle 1, and reaches the visual recognition area EB. That is, the visual recognition area EB is expanded in a direction perpendicular to the up-down direction of the vehicle 1 in which eyes of the occupant are aligned, to improve the visibility of the virtual image VTI with the eyes of the occupant. At the same time, the diffusion is suppressed in the up-down direction of the vehicle 1 more than in the direction perpendicular to the up-down direction of the vehicle 1 where the eyes of the occupants are aligned, to improve the brightness of the virtual image VTI. Thus, it is possible to provide the HUD device 100 with high visibility of the virtual image VTI.

According to the first embodiment, the anisotropic diffusion unit 20 includes the isotropic diffusion layer 21 having an isotropic diffusion angle and the anisotropic prism array layer 23 stacked on the isotropic diffusion layer 21. The anisotropic prism array layer 23 has the plural prism elements 24 arranged along the longitudinal direction LDd corresponding to the image left-right axis Ax. Each of the prism elements 24 is extended along the longitudinal direction LDd corresponding to the image up-down axis Ay, and deflects the illumination light in the short direction SDd corresponding to the image up-down axis Ay. Therefore, the isotropic diffusion in the isotropic diffusion layer 21 is converted into anisotropic diffusion, so that the anisotropic diffusion angle can be easily realized.

According to the first embodiment, each of the prism elements 24 extends along the short direction SDd corresponding to the image up-down axis Ay with a triangular cross section. The prism element 24 has the apex 25 protruding on the opposite side to the isotropic diffusion layer 21 in the triangular cross section. The apex 25 is interposed between the pair of refractive surfaces 26 that refract the illumination light. The prism element 24 has a triangular prism shape. Due to the pair of refractive surfaces 26, illumination lights deflected in opposite directions in the longitudinal direction LDd corresponding to the image left-right axis Ax are mixed, so that the diffusion angle in the longitudinal direction LDd corresponding to the image left-right axis Ax can be made large reliably. Therefore, the visual recognition area EB is expanded in a direction perpendicular to the up-down direction of the vehicle 1 in which the eyes of the occupant are aligned, and the visibility of the virtual image VTI with the eyes can be reliably improved.

According to the first embodiment, the apex angle θ of the apex 25 is an obtuse angle. By setting the apex angle θ to an obtuse angle, the incident angle of the illumination light incident on the pair of refractive surfaces 26 can be restricted from becoming too large. Therefore, the illumination light is restricted from being deflected too much in the longitudinal direction LDd corresponding to the image left-right axis Ax at the refractive surface 26. If the illumination light is deflected too much, it becomes difficult to transmit the illumination light by the image forming unit. (For example, illumination light is shielded by the side surface of the transmissive portion 50b of the image display panel 50). Further, when the illumination light is reflected by the refractive surface 26, the illumination light may be deviated from the optical path. According to the first embodiment, the quality or the brightness of the virtual image VTI can be restricted from being lowered, and the illumination light can be diffused efficiently. Therefore, the visibility of the virtual image VTI can be enhanced.

According to the first embodiment, the anisotropic prism array layer 23 is disposed so that the apex 25 faces the illumination light source unit 10 on the optical path. In this way, the anisotropic prism array layer 23 does not face the image display panel 50. Therefore, even if vibration of the vehicle 1 occurs, the apex 25 is restricted from being rubbed against the image display panel 50, such that wear or breakage of the apex 25 can be suppressed. Therefore, the visibility of the virtual image VTI can be maintained for a long time.

According to the first embodiment, the anisotropic diffusion unit 20 is disposed to be inclined with respect to the optical axis OA so as to face the image and to be parallel to the image display panel 50. In this way, the size of the anisotropic diffusion unit 20 itself can be suppressed. Further, the distance of the diffused light from the anisotropic diffusion unit 20 to the image display panel 50 is made approximately uniform over the entire area. Therefore, the quality of the virtual image VTI can be made uniform in each area of the image.

Second Embodiment

Figure 11:
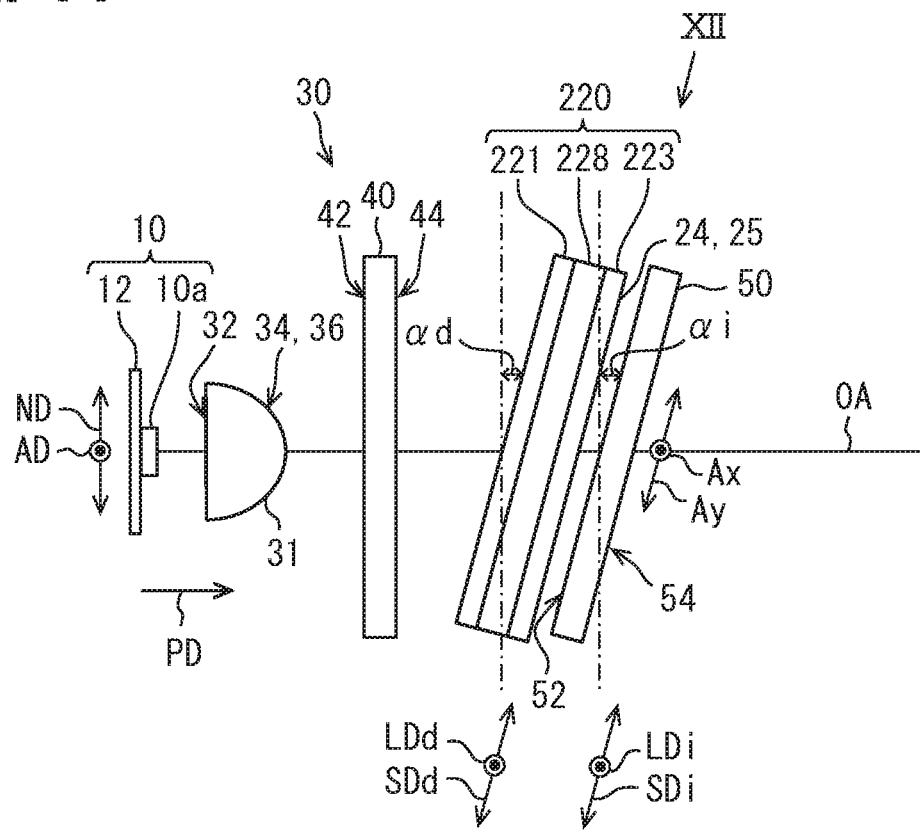
FIG. 11 is a side view schematically illustrating an image projection unit according to a second embodiment.
Figure 12:
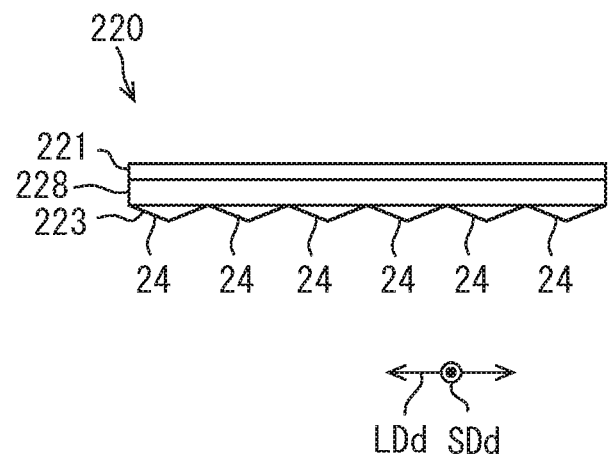
FIG. 12 is a view of an anisotropic diffusion unit of the second embodiment as viewed in a direction XII of FIG. 11.

As shown in FIGS. 11 and 12, a second embodiment is a modification of the first embodiment. The second embodiment will be described focusing on matters different from the first embodiment.

The anisotropic diffusion unit 220 of the second embodiment further includes a polarizing element layer 228. The polarizing element layer 228 is stacked on the isotropic diffusion layer 221 and the anisotropic prism array layer 223 so as to regulate transmission of predetermined polarized light.

Specifically, the polarizing element layer 228 of the present embodiment is a reflection type deflection element using a wire grid. The polarizing element layer 228 is formed in a film shape, and includes plural metal wires extending in the direction orthogonal to the transmission axis TA of the incident polarizing plate 50d of the image display panel 50. The metal wires are made of, for example, aluminum, and are arranged in parallel with each other at a predetermined pitch. The predetermined pitch is set to be smaller than most wavelengths of the illumination light. The predetermined pitch is set to, for example, about 100 to 200 μm. The polarizing element layer 228 reflects light polarized in the extending direction of the metal wire and transmits light polarized in a direction perpendicular to the extending direction.

In the anisotropic diffusion unit 220 of the present embodiment, the isotropic diffusion layer 221, the polarizing element layer 228, and the anisotropic prism array layer 223 are stacked in order from a side of the illumination light source unit 10. For this reason, illumination light which enters the anisotropic diffusion unit 220 from the complex lens array 40 is first diffused isotropically in the isotropic diffusion layer 221. Thereafter, of the illumination light, only the polarized light along the transmission axis TA of the incident polarizing plate 50d of the image display panel 50 transmits through the polarizing element layer 228. That is, the polarizing element layer 228 regulates deflected light to be absorbed by the polarizing plate 50d from transmitting through the anisotropic diffusion unit 220. The polarized illumination light is deflected by the pair of refractive surfaces 26 of the anisotropic prism array layer 223 in the longitudinal direction LDd corresponding to the image left-right axis Ax.

As a result, the anisotropic diffusion unit 220 anisotropically diffuses the illumination light in a state where the diffusion angle is larger in the longitudinal direction LDd corresponding to the image left-right axis Ax than in the short direction SDd corresponding to the image up-down axis Ay. In the first embodiment, the illumination light diffused by the anisotropic diffusion unit 20 is randomly polarized light. In contrast, the anisotropic diffusion unit 220 of the second embodiment diffuses the linearly polarized light along the transmission axis TA of the incident polarizing plate 50d of the image display panel 50. Since the diffusion in the isotropic diffusion layer 221 has the depolarization function relative to the illumination light, in the present embodiment, the degree of polarization of the illumination light emitted from the anisotropic diffusion unit 220 is increased by making the light to pass through the polarizing element layer 228 after the diffusion in the isotropic diffusion layer 221.

When the transmission axis TA of the incident polarizing plate 50d of the image display panel 50 is set along the image left-right axis Ax, the extending direction of the metal wire is along the short direction SDd corresponding to the image up-down axis Ay. In this case, since the illumination light is incident on the pair of refractive surfaces 26 of the anisotropic prism array layer 223 as p-polarized light, the illumination light is suppressed from reflecting at the refractive surface 26.

According to the second embodiment, the anisotropic diffusion unit 220 has the polarizing element layer 228 stacked on the isotropic diffusion layer 221 and the anisotropic prism array layer 223. Due to the polarizing element layer 228, the polarized light to be absorbed by the polarizing plate 50d facing the anisotropic diffusion unit 220 is restricted from passing through the anisotropic diffusion unit 220. Therefore, it is possible to reduce the illumination light to be converted into heat when absorbed by the polarizing plate 50d of the image display panel 50 as an image forming unit. Thus, the durability of the HUD device 100 and the image projection unit 9 is enhanced by suppressing the temperature rise of the image display panel 50. Thus, high visibility of the virtual image VTI can be maintained for a long time.

According to the second embodiment, the isotropic diffusion layer 221, the polarizing element layer 228, and the anisotropic prism array layer 223 are sequentially stacked from a side of the illumination light source unit 10 in the anisotropic diffusion unit 220. The degree of polarization of the illumination light emitted from the anisotropic diffusion unit 220 is increased by the polarizing element layer 228 after diffused in the isotropic diffusion layer 221. Therefore, it is possible to further reduce the proportion of light absorbed by the polarizing plate 50d of the image display panel 50. As a result, the effect of suppressing the temperature rise of the image display panel 50 can be enhanced.

Other Embodiments

Although multiple embodiments have been described above, the present disclosure is not construed as being limited to these embodiments, and can be applied to various embodiments and combinations within a scope that does not depart from the gist of the present disclosure.

Figure 13:
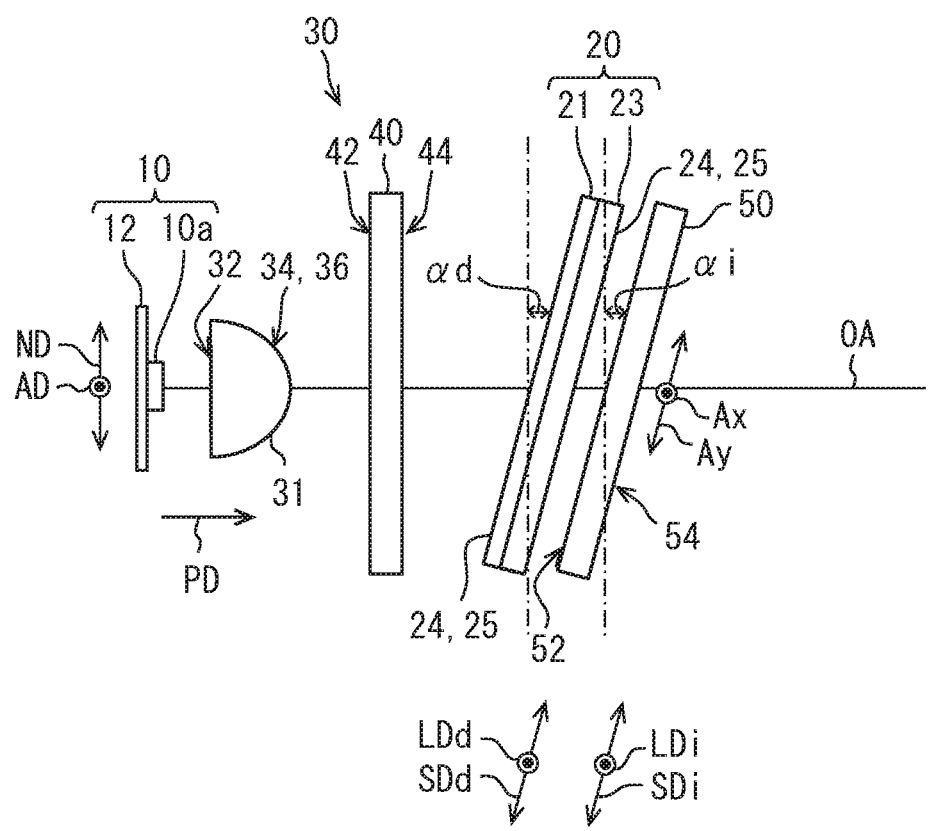
FIG. 13 is a view illustrating Modification 1 and corresponding to FIG. 2.

Specifically, in Modification 1, as shown in FIG. 13, the anisotropic prism array layer 23 may be disposed such that the apex 25 faces the image display panel 50 on the optical path. In other words, the anisotropic prism array layer 23 may be disposed between the image display panel 50 and the isotropic diffusion layer 21, and the isotropic diffusion layer 21 may be disposed between the anisotropic prism array layer 23 and the illumination light source unit 10 or the light collecting unit 30.

Figure 14:
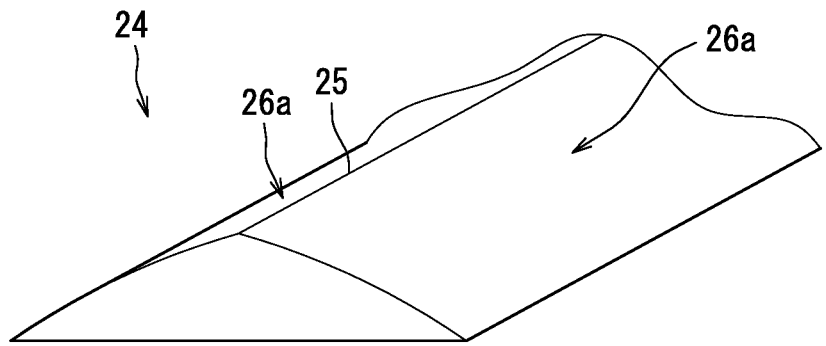
FIG. 14 is a view illustrating an example of Modification 2 and corresponding to FIG. 7.
Figure 15:
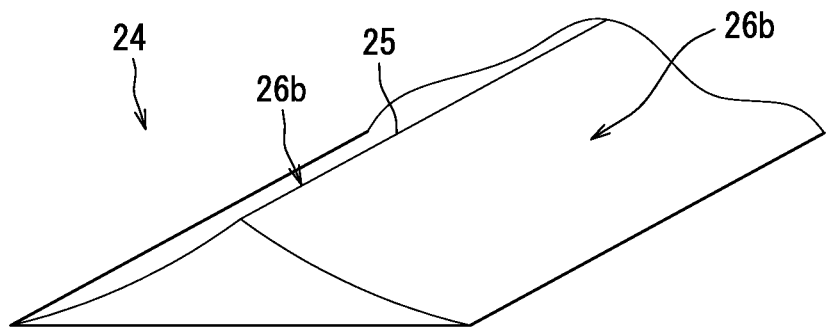
FIG. 15 is a view illustrating another example of Modification 2 and corresponding to FIG. 7.
Figure 16:
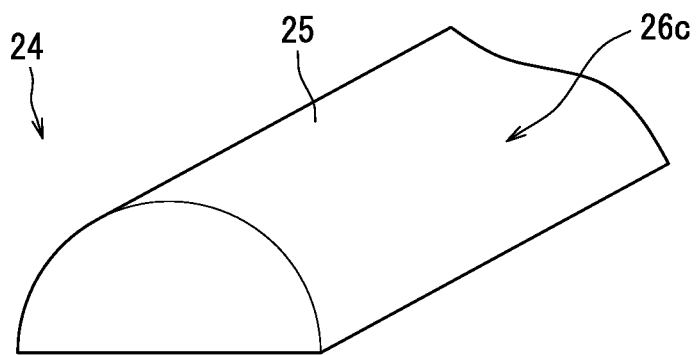
FIG. 16 is a view illustrating another example of Modification 2 and corresponding to FIG. 7.

In Modification 2, in the prism element 24 of the anisotropic prism array layer 23, the pair of refractive surfaces 26a that form the apex 25 may have a cylindrical surface shape curved in a convex shape shown in FIG. 14. Alternatively, the pair of refractive surface 26b may have a cylindrical surface shape curved in a concave shape shown in FIG. 15. In addition, as shown in FIG. 16, the prism element 24 may have a semicircular cross-sectional structure (that is, a structure in which a single cylindrical refractive surface 26c is provided) in which the apex 25 is not sharp.

In Modification 3, instead of the diffusion particles, the isotropic diffusion layer 21 may be realized by a number of fine bubbles formed inside the substrate. The isotropic diffusion layer 21 may have isotropic diffusion property according to the physical properties of the substrate, or the surface of the substrate is roughened to have isotropic diffusion property.

In Modification 4 related to the second embodiment, the polarizing element layer 228 may be made of a reflective polarizing element such as DBEF (registered trademark) manufactured by 3M Co., Ltd., instead of the wire grid. Furthermore, the polarizing element layer 228 may be made of an absorptive polarizing element.

In Modification 5, the anisotropic diffusion unit 20 may have a clearance provided between the isotropic diffusion layer 21 and the anisotropic prism array layer 23.

In Modification 6, the anisotropic diffusion unit 20 may be bonded on the illumination target surface 52 of the image display panel 50.

In Modification 7, the anisotropic diffusion unit 20 may be inclined with respect to the image display panel 50 by being disposed perpendicularly to the optical axis OA. Further, the anisotropic diffusion unit 20 and the image display panel 50 may be disposed in parallel with each other by being disposed perpendicularly to the optical axis OA.

In Modification 8, the complex lens array 40 may be disposed in parallel with the anisotropic diffusion unit 20 by being disposed to be inclined with respect to the optical axis OA.

In Modification 9, various configurations can be applied to the light collecting unit 30 instead of the combination of the light collecting lens array 31 and the complex lens array 40.

In Modification 10, various configurations can be applied to the light guide unit 60 instead of the combination of the plane mirror 61 and the concave mirror 63.

What is claimed is:

1. A head-up display device to be mounted on a vehicle to display a virtual image for an occupant by projecting a display light of an image onto a projection member to reflect, the head-up display device comprising:
    an illumination light source unit that emits illumination light;
    an image forming unit that forms the image by partial transmission of the illumination light and emits the image as the display light; and
    an anisotropic diffusion unit disposed on an optical path between the illumination light source unit and the image forming unit to diffuse the illumination light at an anisotropic diffusion angle, wherein
    when the image is displayed as a virtual image, the image is defined to have an image up-down axis in a direction along an up-down direction of the vehicle and an image left-right axis perpendicular to the image up-down axis,
    the diffusion angle in the anisotropic diffusion unit is larger in a direction corresponding to the image left-right axis than in a direction corresponding to the image up-down axis,
    the anisotropic diffusion unit includes:
        an isotropic diffusion layer having an isotropic diffusion angle, and
        an anisotropic prism array layer stacked on the isotropic diffusion layer, in which a plurality of prism elements are arranged along the direction corresponding to the image left-right axis to deflect the illumination light in the direction corresponding to the image left-right axis, each of the prism elements being extended in the direction corresponding to the image up-down axis, and
        each of the prism elements has a triangular prism shape extended along the direction corresponding to the image up-down axis, a triangular cross section of the prism element having an apex protruding to a side opposite to the isotropic diffusion layer, the apex being interposed between a pair of refractive surfaces refracting the illumination light.

2. The head-up display device according to claim 1, wherein the apex has an apex angle which is an obtuse angle.

3. The head-up display device according to claim 1, wherein
    the anisotropic prism array layer is disposed such that the apex faces the illumination light source unit on the optical path.

4. The head-up display device according to claim 1, wherein
    the image forming unit is a liquid crystal panel having a pair of polarizing plates,
    the anisotropic diffusion unit further has a polarizing element layer stacked on the isotropic diffusion layer and the anisotropic prism array layer, and
    the polarizing element layer regulates a polarized light to be absorbed by one of the polarizing plates adjacent to the anisotropic diffusion unit from transmitting through the anisotropic diffusion unit.

5. A head-up display device to be mounted on a vehicle to display a virtual image for an occupant by projecting a display light of an image onto a projection member to reflect, the head-up display device comprising:
    an illumination light source unit that emits illumination light;
    an image forming unit that forms the image by partial transmission of the illumination light and emits the image as the display light; and
    an anisotropic diffusion unit disposed on an optical path between the illumination light source unit and the image forming unit to diffuse the illumination light at an anisotropic diffusion angle, wherein
    when the image is displayed as a virtual image, the image is defined to have an image up-down axis in a direction along an up-down direction of the vehicle and an image left-right axis perpendicular to the image up-down axis,
    the diffusion angle in the anisotropic diffusion unit is larger in a direction corresponding to the image left-right axis than in a direction corresponding to the image up-down axis,
    the anisotropic diffusion unit includes:
        an isotropic diffusion layer having an isotropic diffusion angle, and
        an anisotropic prism array layer stacked on the isotropic diffusion layer, in which a plurality of prism elements are arranged along the direction corresponding to the image left-right axis to deflect the illumination light in the direction corresponding to the image left-right axis, each of the prism elements being extended in the direction corresponding to the image up-down axis,
    the image forming unit is a liquid crystal panel having a pair of polarizing plates,
    the anisotropic diffusion unit further has a polarizing element layer stacked on the isotropic diffusion layer and the anisotropic prism array layer, and
    the polarizing element layer regulates a polarized light to be absorbed by one of the polarizing plates adjacent to the anisotropic diffusion unit from transmitting through the anisotropic diffusion unit.

6. The head-up display device according to claim 5, wherein
    the image forming unit is a liquid crystal panel having a pair of polarizing plates, and
    the isotropic diffusion layer, the polarizing element layer, and the anisotropic prism array layer are stacked in order in the anisotropic diffusion unit from a side of the illumination light source unit.

7. The head-up display device according to claim 1, wherein
    the image forming unit is formed in a panel shape inclined with respect to an optical axis in the optical path, and
    the anisotropic diffusion unit is disposed to be inclined with respect to the optical axis so as to face the image forming unit and be parallel to the image forming unit.

8. An image projection unit for a head-up display device to be mounted on a vehicle to display a virtual image for an occupant by projecting a display light of an image onto a projection member to reflect, the image projection unit projecting the display light and comprising:

an illumination light source unit that emits illumination light;

an image forming unit that forms the image by partial transmission of the illumination light and emits the image as the display light; and an anisotropic diffusion unit disposed on an optical path between the illumination light source unit and the image forming unit to diffuse the illumination light at an anisotropic diffusion angle, wherein when the image is displayed as a virtual image, the image is defined to have an image up-down axis in a direction along an up-down direction of the vehicle and an image left-right axis perpendicular to the image up-down axis, the diffusion angle in the anisotropic diffusion unit is larger in a direction corresponding to the image left-right axis than in a direction corresponding to the image up-down axis, the anisotropic diffusion unit includes:

an isotropic diffusion layer having an isotropic diffusion angle, and an anisotropic prism array layer stacked on the isotropic diffusion layer, in which a plurality of prism elements are arranged along the direction corresponding to the image left-right axis to deflect the illumination light in the direction corresponding to the image left-right axis, each of the prism elements being extended in the direction corresponding to the image up-down axis, and each of the prism elements has a triangular prism shape extended along the direction corresponding to the image up-down axis, a triangular cross section of the prism element having an apex protruding to a side opposite to the isotropic diffusion layer, the apex being interposed between a pair of refractive surfaces refracting the illumination light.

9. An image projection unit for a head-up display device to be mounted on a vehicle to display a virtual image for an occupant by projecting a display light of an image onto a projection member to reflect, the image projection unit projecting the display light and comprising:

an illumination light source unit that emits illumination light;

an image forming unit that forms the image by partial transmission of the illumination light and emits the image as the display light; and an anisotropic diffusion unit disposed on an optical path between the illumination light source unit and the image forming unit to diffuse the illumination light at an anisotropic diffusion angle, wherein when the image is displayed as a virtual image, the image is defined to have an image up-down axis in a direction along an up-down direction of the vehicle and an image left-right axis perpendicular to the image up-down axis, the diffusion angle in the anisotropic diffusion unit is larger in a direction corresponding to the image left-right axis than in a direction corresponding to the image up-down axis, the anisotropic diffusion unit includes:

an isotropic diffusion layer having an isotropic diffusion angle, and an anisotropic prism array layer stacked on the isotropic diffusion layer, in which a plurality of prism elements are arranged along the direction corresponding to the image left-right axis to deflect the illumination light in the direction corresponding to the image left-right axis, each of the prism elements being extended in the direction corresponding to the image up-down axis, the image forming unit is a liquid crystal panel having a pair of polarizing plates, the anisotropic diffusion unit further has a polarizing element layer stacked on the isotropic diffusion layer and the anisotropic prism array layer, and the polarizing element layer regulates a polarized light to be absorbed by one of the polarizing plates adjacent to the anisotropic diffusion unit from transmitting through the anisotropic diffusion unit.

\* \* \* \* \*